H. GINSBURG.
PERSPECTOSCOPE.
APPLICATION FILED JAN. 5, 1921.
1,415,833. Patented May 9, 1922.
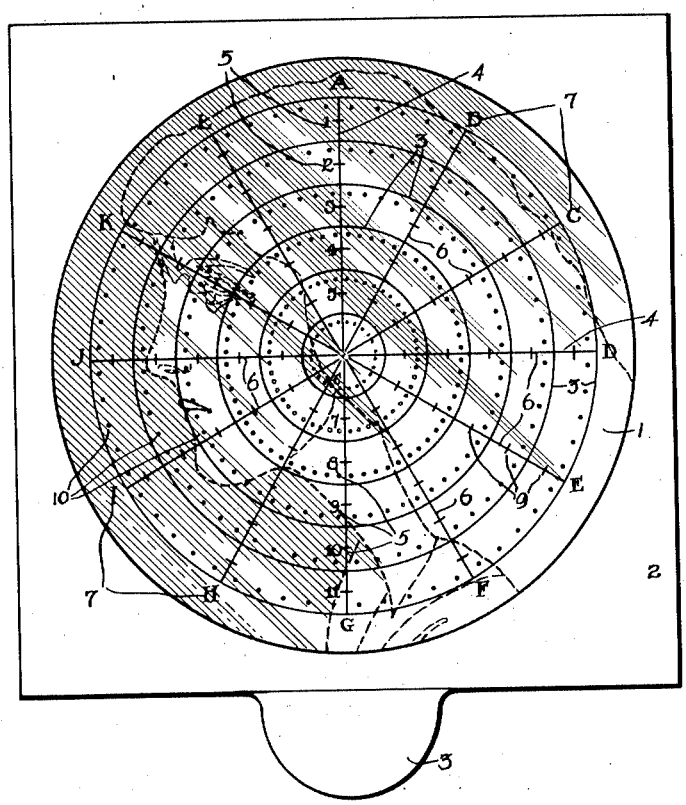
Fig. 1.
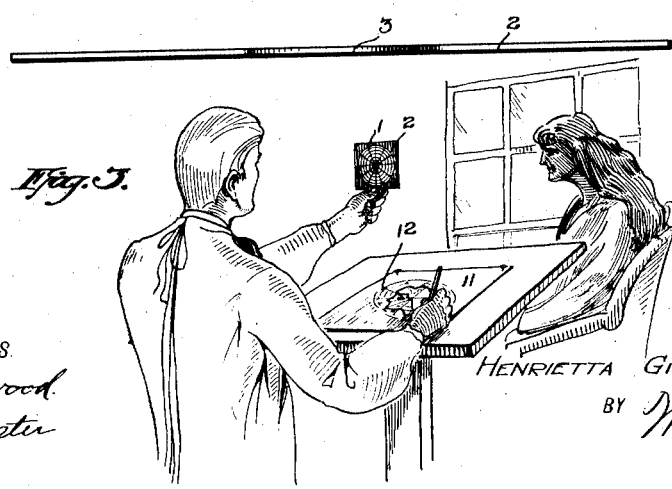
Fig. 2.
Fig. 3.
WITNESSES.
INVENTOR
HENRIETTA GINSBURG.
BY
ATTORNEYS

UNITED STATES PATENT OFFICE.

HENRIETTA GINSBURG, OF EL PASO, TEXAS.

PERSPECTOSCOPE.

1,415,833. Specification of Letters Patent. Patented May 9, 1922.

Application filed January 5, 1921. Serial No. 435,203.

*To all whom it may concern:*

Be it known that I, HENRIETTA GINSBURG, a citizen of the United States, and a resident of El Paso, county of El Paso, and State of Texas, have invented a new and Improved Perspectoscope, of which the following is a full, clear, and exact description.

This invention relates to improvements in perspectoscopes, an object of the invention being to provide a transparent device of this character which will be of material assistance to artists and students of art.

A further object is to provide a perspectoscope having certain markings thereon, and to provide sheets of paper having markings thereon corresponding to the markings on the perspectoscope, so that by looking through the perspectoscope an object may be reproduced upon the paper in its true proportions.

A still further object is to provide a device of the character stated which will be simple and practical in construction, and comparatively inexpensive to manufacture.

With these and other objects in view the invention consists in certain novel features of construction and combinations and arrangements of parts to be more fully hereinafter described and pointed out in the claims.

In the accompanying drawings:

Figure 1 is a view in front elevation of my improved perspectoscope, the dotted lines indicating the appearance of an object to be drawn when seen through the perspectoscope.

Figure 2 is an edge view of Figure 1.

Figure 3 is a perspective view illustrating the manner of use of my improved device.

Referring in detail to the drawings, my improved perspectoscope is in the form of a flat sheet of material preferably rectangular in shape. The central portion of the sheet constitutes a circular transparent portion 1, and the remainder of the sheet 2 is opaque.

This construction may be obtained by taking a sheet of celluloid or similar material, and painting the edges of the sheet black so that a circular transparent portion is left in the center of the sheet. A suitable handle member 3 is formed integral with the lower edge of the sheet.

Any desired number of concentric circles 3 spaced an equal distance apart and having for their common center, the center of the transparent portion 1, are drawn on the transparent portion.

A pair of diameter lines 4 disposed at right angles to each other and parallel to the edges of the sheet serve to divide each circle into quadrants.

Numerals indicated by the reference character 5 are arranged upon the vertical diameter AG or other diameter or diameters, a different numeral being displayed within each semi-circle or within each semi-annular ring formed by the two adjacent circles.

Any number of radial lines such as 6 may be drawn from the center to the periphery of the outer circle. These lines preferably divide the quadrants of the circles into equal sectors. At each point where radial lines intersect the periphery of the largest circle, a different letter or other indicative character such as 7 is displayed.

The perspectoscope may be further subdivided so that a point seen therethrough can be readily placed upon a sheet having corresponding markings; for instance along the radial lines 6 certain marks such as 9 are displayed at equal distances apart and concentrically arranged annular series of dots 10 may be displayed upon the transparent member at fixed distances from each of the circle lines 3.

I also provide drawing paper such as the sheet 11 having thereon markings 12 corresponding to the markings on the perspectoscope. These markings on the paper are merely penciled in and may be easily eradicated after they have served their purpose.

In operation the artist holds the perspectoscope at arm's length or holds or fixes it at a particular length from the eye and focuses the center of the transparent portion on the model or the scene which he proposes to reproduce upon the paper. Figure 3 illustrates the use at arm's length.

The operator or artist having determined upon the position of the perspectoscope with respect to the eye and the object he proposes to reproduce will note the point on the object which coincides with the center of the perspectoscope (or the point of the object intersected by the line established by the eye and the center of the perspectoscope). Thereafter in the same operation in determining the coordinates of points of the object the eye, perspectoscope and object must be in the same positions, the center of the perspectoscope coinciding with this selected center of the object.

He will note through the perspectoscope the coordinates of salient points of the object to be sketched and plot these salient points on the graduated paper in the same relative positions. The extent to which this mechanical plotting will be continued will depend upon the accuracy desired, the free-hand drawing ability of the artist and his discretion. In the free hand filling in that follows the artist can be guided by the perspectoscope in as much detail as he desires. For instance, in sketching the profile illustrated in Figure 1, the artist would note that the eyelid was located on the $k$ line in a circle 3 at its point of intersection with one of the marks 7, and he would draw it in a similar position on the paper.

The device is not intended to guarantee absolute accuracy of proportion, nor to make free hand drawing a mechanical process, but it will prove a great help in obtaining approximately the correct proportions of the subject matter that is sketched.

The sheets 11 may be of various sizes as long as the markings thereon are proportionate to the markings on the perspectoscope.

Various slight changes and alterations might be made in the general form and arrangement of the parts described without departing from the invention, and hence I do not limit myself to the precise details set forth but consider myself at liberty to make such changes and alterations as fairly fall within the spirit and scope of the appended claims.

What I claim is:

1. A device of the character stated comprising, a transparent member having a series of concentrically arranged circular lines thereon, and having radially disposed lines intersecting said circular lines and having marks indicating radial directions arranged on the circular lines between the radial lines, said device adapted to be used in connection with a sheet of drawing material similarly marked.

2. As a new article of manufacture, a perspectoscope including an opaque sheet of material having a centrally disposed transparent portion, said transparent portion having displayed thereon a series of concentrically arranged circles, and a plurality of radially disposed lines intersecting said circles, said circles having a series of marks thereon between the radial lines indicating radial or angular distances and a handle member integral with said sheet.

HENRIETTA GINSBURG.